United States Patent

Lanner et al.

Patent Number: 5,433,961
Date of Patent: Jul. 18, 1995

[54] CONTINUOUS PREPARATION OF NON-AGGREGATED EDIBLE CORES WITH CRISP FARINACEOUS COATINGS

[75] Inventors: David A. Lanner, Cincinnati; Benito Romanach, West Chester; Yen C. Hsieh, Cincinnati; Martin A. Mishkin, Loveland, all of Ohio

[73] Assignee: The Procter & Gamble Company, Cincinnati, Ohio

[21] Appl. No.: 17,551

[22] Filed: Feb. 16, 1993

[51] Int. Cl.$^6$ .......................... A23L 1/10; A23L 1/164
[52] U.S. Cl. ........................................ 426/93; 426/94; 426/293; 426/295; 426/296
[58] Field of Search ................... 426/94, 94, 293, 295, 426/296

[56] References Cited

U.S. PATENT DOCUMENTS

| | | | |
|---|---|---|---|
| 3,063,843 | 11/1962 | Hashimoto | 99/126 |
| 3,527,646 | 9/1970 | Scheick et al. | 99/166 |
| 3,557,718 | 1/1971 | Chivers | 107/54 |
| 3,615,676 | 10/1971 | McKown et al. | 99/83 |
| 4,161,545 | 7/1979 | Green et al. | 426/93 |
| 4,499,113 | 2/1985 | Mochizuki et al. | 426/291 |
| 4,663,175 | 5/1987 | Werner et al. | 426/289 |
| 4,755,390 | 7/1988 | Calandro et al. | 426/293 |
| 4,769,248 | 9/1988 | Wilkins et al. | 426/291 |
| 4,828,858 | 5/1989 | Holloway, Jr. et al. | 426/293 |
| 5,010,838 | 4/1991 | Simelunas et al. | 118/19 |
| 5,061,499 | 10/1991 | Holloway, Jr. et al. | 426/93 |

FOREIGN PATENT DOCUMENTS 0231817 1/1987 WIPO .................. A23P 1/08

Primary Examiner—Donald E. Czaja
Assistant Examiner—Mary S. Mims
Attorney, Agent, or Firm—William J. Winter; Brahm J. Corstanje; Rose Ann Dabek

[57] ABSTRACT

A tumbling bed of edible cores is formed which has a longitudinal axis extending from an entrance end to an exit end of the tumbling bed. Individual edible cores travel through the tumbling bed from the entrance end to the exit end by rotating in a generally helical path along the longitudinal axis of the bed. The edible cores are coated within the bed by repeatedly tumbling through both a wet zone(s) and a dry zone(s) formed within the bed. These wet and dry zones are formed, respectively, by spraying the surface of the tumbling bed with a hydrating liquid and by dusting the surface of the tumbling bed with a farinaceous powder. Both the wet and dry zones thus formed are generally rectangular, but not overlapping, zones with the major dimensions of these rectangular zones being substantially parallel to the longitudinal axis of the tumbling bed. Hydrating liquid and farinaceous powder are applied, respectively, to the wet and dry zones of the tumbling bed at rates which prevent aggregation of the edible cores and at rates which are suitable to form on the cores a dough-coating comprising flour, starch and sugar in a weight ratio of flour and starch to sugar of from about 0.5:1 to 30:1. The dough-coated edible cores are then cooked until crisp.

21 Claims, 2 Drawing Sheets

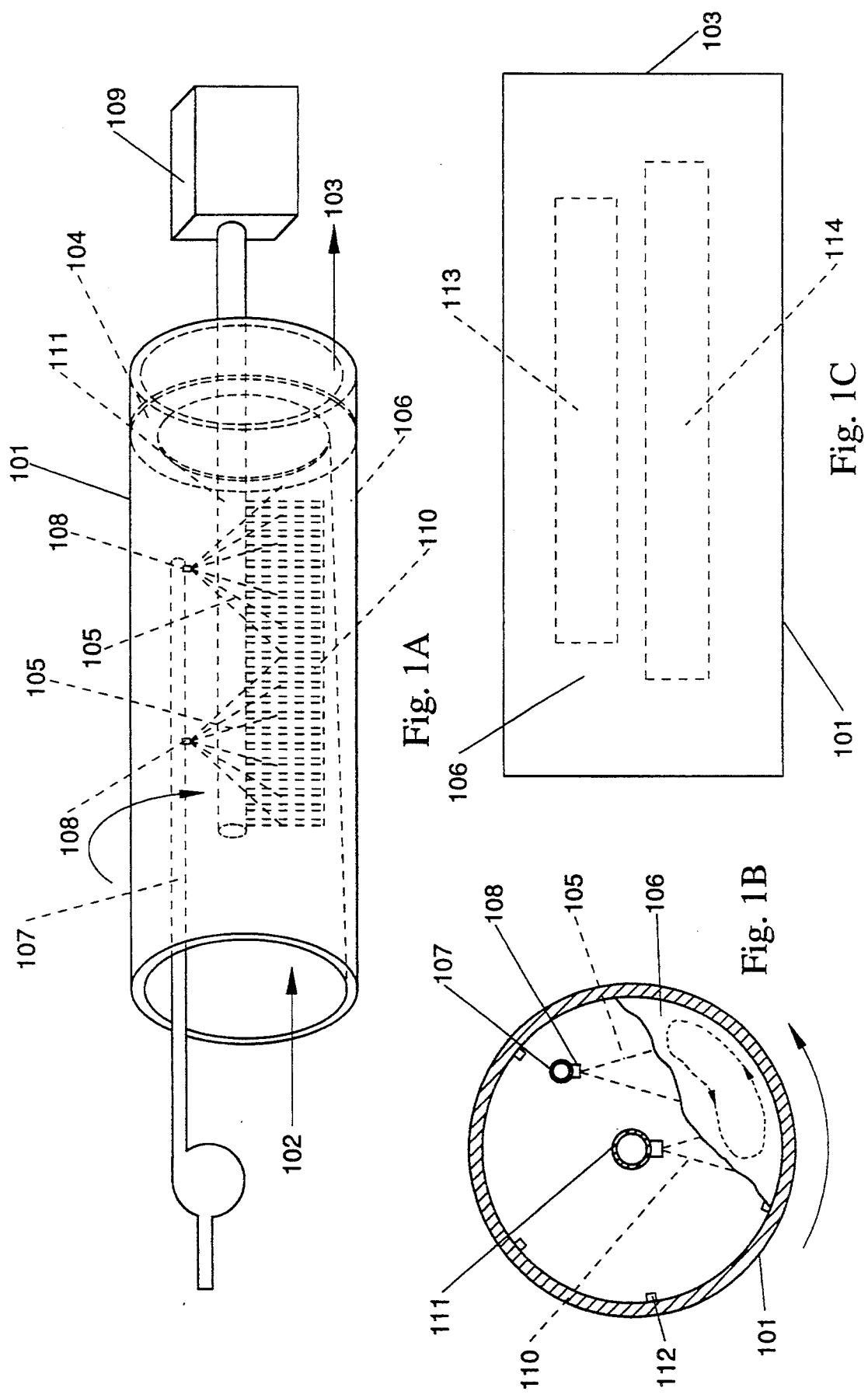

CONTINUOUS PREPARATION OF NON-AGGREGATED EDIBLE CORES WITH CRISP FARINACEOUS COATINGS

FIELD OF THE INVENTION

This invention relates to the continuous preparation of non-aggregated edible cores with crisp farinaceous coatings. Coated edible cores of this type are useful, for example, as snack food products such as coated nuts.

BACKGROUND OF THE INVENTION

Edible cores (e.g., coatable food particulates) are often coated with materials that provide flavor or texture benefits. Examples of such products include honey roasted nuts, chocolate covered nuts, chocolate or yogurt covered raisins, seasoned extruded particulates, candy coated chocolate particulates, and so on.

However, it has been especially difficult to provide processes for coating individual edible cores with some types of coatings such as a farinaceous dough. One attempt at providing such a process is disclosed in U.S. Pat. No. 4,499,113 to Mochizuki et al., issued Feb. 12, 1985. Mochizuki et al. discloses a batch process for preparing snack products having an expanded, crisp, fried coating. Edible cores are alternatively and repeatedly sprinkled or sprayed with a starchy flour mixture and an aqueous sugar solution. The cores are so treated while they are held in a tumbling coater such as a revolving pan or rotary drum. After edible cores in the batch are sufficiently coated, they are then oil fried.

Batch processing methods have historically been employed when coating individual edible cores with a farinaceous dough. Only when the current batch of edible cores is coated can the next batch be processed. Batch processing methods typically involve first adding an adhesive material to a batch of edible cores. When the edible cores are sufficiently coated with the adhesive, a farinaceous powder is applied to the adhesive-coated edible cores. The resulting coated edible cores are then baked or oil fried.

These batch processing methods with respect to farinaceous dough coating processes are inefficient. Only small amounts of coated edible cores can be produced per batch (e.g., up to about 200 lbs/batch/15-30 minutes). Increasing production rates often requires the use of concurrent batch operations. Concurrent batch operations, however, require more machinery, factory space and personnel. It is also difficult to maintain a consistent product composition (e.g., coating thickness, coating composition) among different batches.

Given these limitations associated with batch processing methods, it would be highly desirable to provide a continuous process for coating edible cores in a farinaceous dough. Although there are many known processes for continuously coating edible cores, such processes do not generally involve products having farinaceous dough coatings. Attempts to carry out continuous farinaceous dough coating processes typically result in aggregated, unevenly coated or overly coated edible cores. It is especially difficult to continuously produce evenly coated, non-aggregated edible cores when the farinaceous coating (after cooking) represents between about 15 and 70% by weight of the edible cores.

Given the foregoing, there remains a need to provide improved processes for coating edible cores with suitable amounts of a farinaceous dough. In particular, there is a need for providing efficient continuous processes for evenly coating non-aggregated edible cores with a farinaceous dough.

SUMMARY OF THE INVENTION

In its process aspects, the present invention relates to a continuous process for making non-aggregated edible cores which are uniformly coated with a crisp farinaceous material. Such a process involves forming a tumbling bed of edible core particles that are treated within the tumbling bed to form a dough coating thereon. These dough-coated particles emerging from the tumbling bed are then cooked to form the desired coated products.

The tumbling bed of edible cores used in this process has a longitudinal axis extending from an entrance end to an exit end of the bed. The individual edible cores travel through this bed from the entrance to the exit ends by rotating in a generally helical path along the longitudinal axis of the bed.

The edible cores are coated within the bed by repeatedly tumbling through both a wet zone(s) and a dry zone(s) formed within the bed. These wet and dry zones are formed, respectively, by spraying the surface of the tumbling bed with a hydrating liquid and by dusting the surface of the tumbling bed with a farinaceous powder. Both the wet and dry zones thus formed are generally rectangular, but not overlapping, zones with the major dimensions of these rectangular zones being substantially parallel to the longitudinal axis of the tumbling bed. Aqueous liquid and farinaceous powder are applied, respectively, to the wet and dry zones of the tumbling bed at rates which prevent aggregation of the edible cores and at rates which are suitable to form on the cores a dough-coating comprising flour, starch and sugar in a weight ratio of flour and starch to sugar of from about 0.5:1 to 30:1.

In its product aspects, the present invention relates to non-aggregated edible cores which are uniformly coated with a crisp farinaceous material. Such edible cores are those which result from cooking the dough-coated cores produced in the tumbling bed as hereinbefore described.

BRIEF DESCRIPTION OF THE DRAWINGS

FIG. 1A illustrates a rotating drum containing a tumbling bed of edible cores being subjected to the dusting and spraying procedures of the present invention. FIG. 1B illustrates a cross-sectional view of such a rotating drum. FIG. 1C illustrates the parallel non-overlapping wet and dry zones of the tumbling bed.

DETAILED DESCRIPTION OF THE INVENTION

Preparation of the coated edible cores herein involves three simultaneously occurring steps (coating operation) and a subsequent fourth step (cooking step). Each of these steps is described in detail as follows.

A. Coating Operation—Tumbling Bed of Edible Cores

In the first step of the process, a tumbling bed of edible cores is formed. This tumbling bed is then subjected to the dusting and spraying steps described hereinafter.

The motion of the edible cores in the tumbling bed should conform with that which occurs when particulate material is continuously passed through a tilted rotating drum. Thus to form a suitable tumbling bed, edible cores can be continuously metered into an entrance end and out of an exit end of a tumbler coater (e.g., rotating drum). The edible cores within the tumbling bed are continuously and repeatedly rotated through the tumbling bed by way of the continuous rotating motion of the tumbler coater (see FIG. 1B). While rotating through the tumbling bed, the edible cores also travel along the longitudinal axis of the bed toward the exit end of the tumbling bed. Individual core rotation thus moves in a generally helical path as they travel through the tumbling bed.

Devices suitable for use in preparing the tumbling bed used in the process herein are those that can provide the edible cope motion described hereinabove. That is, the device should have a means for rotating the edible cores while also moving them along the longitudinal axis of the bed that is substantially perpendicular to the rotating motion. Examples of suitable devices include rotating drums and troughs with internal augers. Preferably, the tumbler coater for use in the process is a rotating drum. Suitable rotating drums include vented rotating drums, heated rotating drums, ribbed rotating drums, rotating drums with screw conveyance flight and variations thereof. The rotating drum should have ribbings or flights on its interior rotating surface or similar other means for facilitating the desired tumbling motion of the edible cores in the tumbling bed. The term "drum" as used herein means revolving pans and rotating drums.

When a rotating drum is utilized, it preferably has its entrance end elevated above its exit end. The angle of elevation is typically from about 0.2° to 8°, more typically from about 2 to 5 degrees. This elevation acts as a means for moving the edible cores, which are rotating within the drum, along the longitudinal axis of the rotating drum toward the exit end of the drum. Less preferably, the means for moving the edible cores along the longitudinal axis can be by screw conveyance flight, internal auger or other similar means.

Figure 2A:
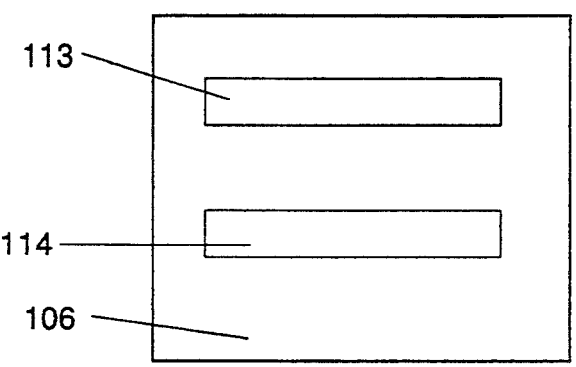
FIGS. 2A, 2B, 2C and 2D illustrate sample configurations of the parallel non-overlapping wet zones (WET) and dry zones (DRY) within the tumbling bed (BED) used in the present invention.
Figure 2B:
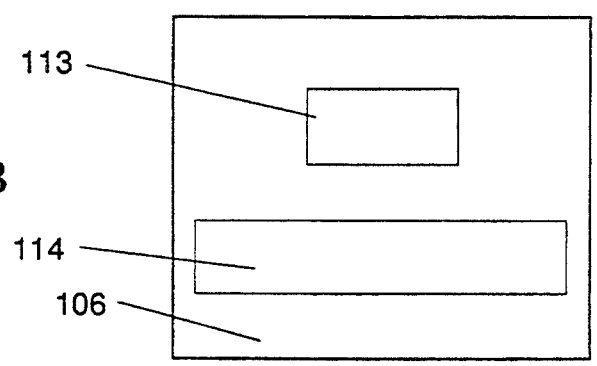
Figure 2C:
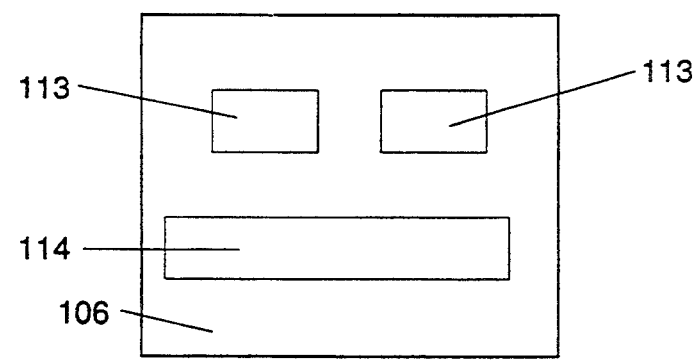
Figure 2D:
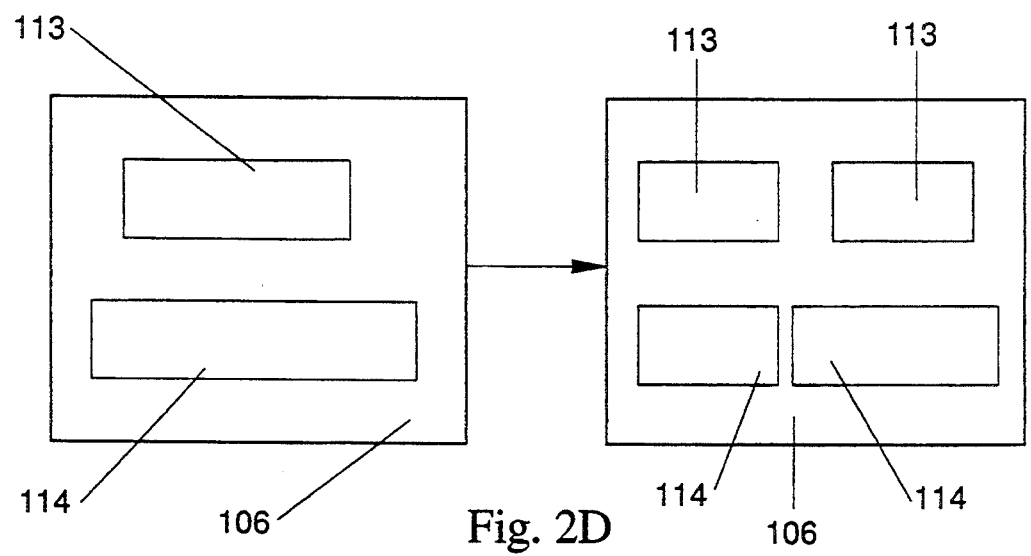

Any size or scale of rotating drum can be used in the instant process. For example, conventional rotating drums having internal dimensions ranging from about 6 ft×2 ft to 15 ft×3 ft can be employed. The coating operation can be practiced in a single rotating drum, in a series of rotating drums (see FIG. 2D), or repeated within any single rotating drum (see FIG. 2C). When a series of drums is utilized, the three steps within the coating operation (forming a tumbling bed, dusting step, spraying step) can occur within each of the drums. In such a series, coated edible cores emerge from the exit end of one drum and pass into the entrance end of the next drum, and so on. Various continuous processing steps (e.g., baking, coating, dusting, etc.) can be introduced between the rotating drums in the series. A series of drums is especially useful for applying multiple dough layers onto individual edible cores (e.g., texture layer followed by a flavor layer, crunchy texture layer followed by a crisp texture layer).

Edible cores suitable for use in the instant invention include nuts such as almonds, cashews, Brazil nuts, filberts, peanuts, pecans, macadamia nuts and walnuts. Other suitable edible cores include seeds, beans, fruits, meats, cereals, particulates thereof, and agglomerates thereof. In fact, almost any edible core is coatable if it can readily tumble within the tumbling bed described herein. Ideally, to provide an even coating around the edible core, the edible core should be capable of tumbling randomly along any of its axes. Accordingly, substantially spherical cores (e.g., peanuts) can be more evenly coated in the instant process than can non-spherical cores (e.g., cashews, almonds, pecans). Accordingly, the edible cores for use in the instant process are preferably peanuts.

B. Coating Operation—Spraying and Dusting Steps

During the coating operation, edible cores within the tumbling bed are evenly coated with a farinaceous dough. This operation includes simultaneous and continuous spraying and dusting steps. The materials dusted and sprayed onto the edible cores combine to form a farinaceous dough coating. As used herein, "continuous dusting" and "continuous spraying" includes procedures wherein the dusting and/or spraying is intermittent.

The tumbling bed of edible cores comprises non-overlapping parallel wet and dry zones. The wet zone is defined by the area of the tumbling bed that is continuously sprayed with a hydrating liquid described hereinafter. The dry zone is defined by the area of the tumbling bed that is continuously dusted with a farinaceous powder also described hereinafter. The non-overlapping wet and dry zones are generally rectangular and have separate but substantially major dimensions, wherein each major dimension extends toward the exit and entrance ends of the tumbling bed. The tumbling bed can, in fact, comprise several sequential and distinct wet and dry zones which can be positioned in various relationships to each other so long as the wet and dry zones do not overlap. Examples of suitable wet and dry zone configurations are illustrated in FIGS. 2A, 2B, 2C and 2D.

It is important that the major dimension of the wet zone(s) not extend beyond the major dimension of the dry zone(s) toward either end of the tumbling bed. If the major dimension of the wet zone extends beyond that of the dry zone, the edible cores in the tumbling bed will tend to aggregate. Preferably, one or more of the major dimensions of the dry zone(s) extend beyond the corresponding major dimension of the wet zone(s) (see FIG. 2B). More preferably, the major dimension at the entrance end of the dry zone extends up to about 4 inches beyond the corresponding dimension of the wet zone, and the major dimension at the exit end of the dry zone extends at least about 4 inches, most preferably from about 6 to 8 inches beyond the corresponding dimension of the wet zone.

i. Spraying step

In the spraying step, a hydrating liquid is sprayed continuously onto the tumbling bed to form the wet zone of the bed. As the edible cores in the tumbling bed rotate repeatedly through the wet zone, their surfaces are repeatedly hydrated with the hydrating liquid.

The hydrating liquid preferably comprises up to about 100% by weight of water and from about 0 to 60% by weight of sugar. The hydrating liquid can also contain seasoning, salt, modified pregelatinized starch, gums, flavoring, maltodextrin, oil/shortening, coloring and dairy products. Suitable sugars for use in the instant process include granulated, powdered and syrup sugars. Suitable syrups include corn syrup, high fructose corn syrup, honey, maple syrup, imitation maple syrup, high maltose syrup, rice syrup, molasses, sorghum syrup and syrups made from sucrose, glucose, fructose and invert sugar.

The rate at which the hydrating liquid is sprayed onto the wet zone is carefully controlled. The spraying rate will affect the degree of hydration of the forming dough coating and, accordingly, the texture of the crisp coating produced therefrom. Excessive spraying rates can also cause aggregation of the tumbling edible cores. The spraying rate is determined primarily by 1) the depth of the tumbling bed, 2) the composition of the hydrating liquid and the separately dispensed farinaceous powder, 3) the rotation rate of the tumbler coater, 4) the rate at which the edible cores pass through the tumbling bed, and 5) the rate at which the farinaceous powder is dusted onto the dry zone of the tumbling bed.

The hydrating liquid should be sprayed over a broad area of the tumbling bed. The area so sprayed, of course, then defines the wet zone of the tumbling bed. It is important to avoid spraying any of the hydrating liquid directly onto the rotating surface of the tumbler coater. Failure to avoid such direct spraying can result in dough and edible core adhesion to the rotating surface. This build up can disrupt the motion of the edible cores in the tumbling bed. Disrupting this motion can reduce the uniformity of the dough coating around the individual edible cores. It can also result in aggregation of the edible cores in the tumbling bed. Consequently, when such residues develop on the rotating surfaces, the continuous coating process must be interrupted and the rotating surfaces cleaned.

Preferably, the wet zone comprises a series of wet zones positioned along the longitudinal axis of the tumbling bed. The wet zones are separated by recovery zones, e.g., two wet zones and an intermediate recovery zone. Recovery zones are areas of the tumbling bed that are subjected to neither the dusting nor the spraying procedures described herein. The series is in parallel with but does not overlap a continuous dry zone. Accordingly, each wet zone and recovery zone in the series is in parallel with the same non-overlapping continuous dry zone (see FIG. 2C). The recovery areas help prevent build-up on the rotating surface and aggregation of the edible cores in the tumbling bed. The longitudinal dimension of the recovery zones should be sufficient to reestablish the free-flowing nature of the edible cores in the tumbling bed. For example, when higher weight ratios of hydrating liquid to farinaceous powder are applied to the parallel non-overlapping wet and dry zones, the recovery zones may need to be longer.

The hydrating liquid can be sprayed onto the wet zone by conventional spraying means. In fact, any spraying or dripping device that can deliver the hydrating liquid to the wet zone in the manner described hereinbefore can be used in the spraying step. Suitable spraying devices include pneumatic spray nozzles, drip manifolds, and manifolds with attached spray nozzles connected to a pump or pressurized vessel.

ii. Dusting step

In the dusting step, a farinaceous powder is continuously dusted onto the dry zone of the tumbling bed. As the edible cores repeatedly rotate through both the wet and dry zones, they are repeatedly coated by the farinaceous powder in the dry zone and the hydrating liquid in the wet zone thereby forming a farinaceous dough around the individual edible cores. For purposes of the present invention, a farinaceous dough means material comprising flour and water that when cooked is expandable into a crisp material. As used herein, farinaceous flour means finely ground cereal grains or the starch component thereof.

The rate at which the farinaceous powder is applied to the dry zone is carefully controlled. The rate is preferably maintained at the point at which the tumbling edible cores no longer have a tendency to adhere and form aggregates. If the dusting rate is too low, the edible cores will form aggregates. If the dusting rate is too high, doughy particulates will form among the dough coated edible cores. The weight ratio of the farinaceous powder to the hydrating liquid applied to the tumbling bed will typically be from about 1:2 and 5:1, more typically from about 1:1 to 2:1.

The farinaceous powder contains flour, preferably from about 20 to 100%, more preferably from about 35 to 95% by weight of flour. The farinaceous powder further comprises from about 0 to 50%, more preferably from about 5 to 40% by weight of pregelatinized starch. The pregelatinized starch is preferably a pregelatinized modified waxy starch. Flours suitable for use in the dusting step include nut flour and cereal grain flours derived from wheat, rice, oats, corn, barley, rye or mixtures thereof. Rice flour is preferred. The farinaceous powder can also contain seasoning, flavoring, leavening agents, sugar, salt, fiber, or other fine particulates that can adhere to the edible cores during the continuous process.

It is important that the combined composition of the farinaceous powder and the hydrating liquid so applied to the tumbling bed of edible cores comprise flour, starch and sugar such that the weight ratio of flour and starch to sugar is from about 0.5:1 to 30:1, preferably from about 1.5:1 to 10:1. The flour and starch are provided primarily by the farinaceous powder. The sugar is typically provided by the hydrating liquid but it can be provided by the hydrating liquid and/or the farinaceous powder. Accordingly, the farinaceous dough coating formed on the individual edible cores must also contain flour, starch and sugar in these weight ratios. These weight ratios, when applied via the process described herein, are critical to the realization of the crisp texture of the coated snack product produced in accordance with the instant process.

When the major dimension of the dry zone toward the exit end of the tumbling bed preferably extends beyond that of the wet zone (as described hereinbefore), the area of the dry zone so extended is most preferably dusted with a native ungelatinized starch. This reduces the adhesive tendency of the dough-coated edible cores during cooking. Accordingly, the vertical depth of the bed of edible cores in the cooking step can be increased. This further increases the production rate at which the process described herein can operate.

The farinaceous powder can be dusted onto the dry zone by conventional means. In fact, any device that can deliver the farinaceous powder to the dry zone in the manner described hereinbefore can be used. Such devices include auger feeders, conveyor feeders and vibratory feeders.

Once the edible cores travel through the tumbling bed and have been subjected to the dusting and spraying steps, they continuously emerge from the exit end of the bed evenly and individually coated with a farinaceous dough.

C. Cooking Step

After emerging from the tumbling bed, the dough-coated edible cores are then cooked until crisp. The cooking can involve conventional baking, microwaving or oil frying methods. Preferably, the cooking involves a continuous baking operation.

In the preferred continuous baking operation, the dough-coated edible cores emerging on a continuous bases from the exit end of the tumbling bed are conveyed, by continuous belt conveyor or like means, through a baking zone. The baking zone comprises an oven and a means for conveying the dough-coated edible cores therethrough. Air temperatures within the baking zone are generally from about 220° F. to 400° F., more typically from about 280° F. to 350° F. Baking or residence times for the dough-coated edible cores in the baking zone are generally from about 10 to 60 minutes, more typically from about 12 to 30 minutes. When the dough-coated edible cores comprise non-roasted nuts, the baking can also provide partial or complete roasting of the nuts as well.

Optionally, the coated edible cores can be further treated or coated with salt, oil, starch and/or gum solutions, sugar, seasoning, flavorants, chocolate, candy and so on. The coated edible cores can also be further coated with farinaceous materials by way of conventional batch processing methods or the continuous coating process described herein.

D. Process Benefits

The process described herein provides a highly efficient means for providing edible cores with a substantially uniform, crisp farinaceous coating. First, the rate of production of these coated products is increased dramatically over existing coating methods. For example, this continuous process can be used to produce up to about 10,000 lbs/hr of coated peanuts on conventional machinery. Modification of such machinery could provide a means of further increasing these production rates. By contrast, a batch operation can provide only about 600 lbs/hr of coated peanuts per batch pan. Secondly, production costs are reduced. It is well known that providing edible cores with crisp farinaceous coatings is costly. The cost is due largely to the batch processing methods heretofore thought necessary for making these coated products. Compared to batch processing methods, the continuous process described herein is less labor intensive, requires fewer machines and uses less factory space.

The continuous process also allows for the consistent production of evenly coated edible cores. That is, undesirable variations in coating compositions experienced by separate batch operations is greatly reduced by this continuous process.

The crisp farinaceous coating produced by the process is remarkably uniform and exhibits an improved crispy texture. The crisp uniform coating preferably represents from about 15 to 70%, more preferably from about 25 to 60%, most preferably from about 30 to 50% by weight of the coated edible core. This substantially uniform coating tends to preserve the natural shape of the underlying edible core (e.g., coated peanuts retain a peanut-like shape).

APPARATUS

A suitable device for use in the instant process is illustrated in FIGS. 1A, 1B and 1C. The tilted rotating drum 101 has an entrance end 102 and an exit end 103. A retainer ring 104 is fixed within the rotating drum 101 toward the exit end 103 of the drum. The rotating surface of the drum contains ribbings 112. To deliver the hydrating liquid as a fine spray 105 to the tumbling bed of edible cores 106, a spray bar 107 with two attached spray nozzles 108 is positioned within the rotating drum. To deliver the farinaceous powder from the flour hopper 109 as a curtain of farinaceous powder 110 to the tumbling bed of edible cores 106, an auger feeder 111 is fixed to the flour hopper 109 and positioned within the drum 101. The tumbling bed of edible cores 106 comprises parallel non-overlapping wet 113 and dry zones 114.

EXAMPLES

The continuous coating process as described hereinbefore is illustrated by the following examples.

EXAMPLE I

The hydrating liquid and the farinaceous powder compositions listed below are prepared by conventional means.

| Farinaceous powder | | Hydrating liquid | |
| --- | --- | --- | --- |
| modified pregel waxy starch | 37. wt % | water | 66.6 wt % |
| rice flour | 18 wt % | honey | 4.5 wt % |
| unbleached flour | 37 wt % | sugar | 28.9 wt % |
| baking powder | 1.8 wt % | | |
| salt | 2.3 wt % | | |
| sugar (6x) | 3.9 wt % | | |

Raw blanched peanuts (1000 lbs/hr) are passed through a tilted (2.5°) drum rotating at 15 rpm. The rotating drum (12 ft×3 ft) has a ribbed rotating surface and a 4 inch retention ring positioned 28.5 inches from the exit end of the drum. The depth of the tumbling bed increases from a single peanut layer at the entrance end of the bed to about 4 inches at the retention ring. Two spray nozzles continuously deliver the hydrating liquid to the wet zone of the tumbling bed while an Accurate feeder continuously dusts a parallel non-overlapping dry zone with the farinaceous powder. The major dimension of the dry zone is 55 inches. The wet zone comprises two sequential wet zones each with a 14–16 inch major dimension. The two wet zones are separated by a 12 inch recovery zone. The major dimension of the dry zone extends beyond the major dimension of the wet zones at the entrance end by 4 inches and at the exit end by 7 inches.

The weight ratio of farinaceous powder to hydrating liquid applied to the tumbling bed is about 1.1:1. The spray nozzle toward the entrance end delivers about 40% by weight of the hydrating liquid while the other spray nozzle delivers about 60% by weight of the hydrating liquid.

Peanuts having a uniform dough coating continuously emerge from the exit end of the rotating drum. The dough contains flour, starch and sugar in a weight ratio of flour and starch to sugar of 6:1. The dough-coated peanuts are roasted until crisp (about 12 minutes) in a Proctor Shwartz oven with zone temperatures of 300° F. and 305° F. The crisp uniform coating around the individual nuts represents about 38 to 40% by weight of the coated product.

EXAMPLE 2

The crisp coated peanuts from EXAMPLE 1 are then sprayed with an adhesive liquid, dusted with seasoning, and then lightly roasted at 270° F. for 4–5 minutes. The weight ratio of adhesive liquid to seasoning is 1:2. The adhesive liquid contains granulated sugar (30 wt %), salt (0.5 wt %), gum or modified starch (4.0 wt %) and water (51.5 wt %). The seasoned nuts are sprayed with peanut oil and then packaged in glass containers.

EXAMPLE 3

Raw unblanched peanuts are coated and baked as in EXAMPLE 1 using the following materials.

| Farinaceous powder | | Hydrating liquid | |
| --- | --- | --- | --- |
| pregel. modified waxy starch | 37 wt % | water | 61.6 wt % |
| rice flour | 18 wt % | honey | 4.5 wt % |
| whole wheat flour | 6 wt % | sugar | 28.9 wt % |
| oat flour | 31 wt % | malt | 5 wt % |
| baking powder | 1.8 wt % | flavor | |
| salt | 2.3 wt % | | |
| sugar (6x) | 3.9 wt % | | |

The uniform dough coating formed around the individual peanuts prior to baking comprises flour, starch and sugar in a weight ratio of flour and starch to sugar of 3:1. After baking, the crisp farinaceous coating represents about 35% by weight of the coated product.

The baked coated peanuts are then sprayed with an adhesive liquid, dusted with seasoning (honey roasted seasoning), and then dried in a roasting oven at 280° F. for 4–5 minutes. The weight ratio of adhesive liquid to seasoning is 1:5. The adhesive liquid contains water (64 wt %), honey (16 wt %), sugar (5 wt %) and film-forming modified starch (5 wt %). The seasoned nuts are sprayed with peanut oil and then packaged in glass containers.

EXAMPLE 4

Rather than seasoning the baked coated peanuts in EXAMPLE 3, the coated peanuts are further coated with a light milk or dark chocolate. The chocolate coating is applied to the coated nuts via conventional pan coating methods.

What is claimed is:

1. A continuous process for making non-aggregated edible cores uniformly coated with a crisp farinaceous material, which process comprises the steps of:
   a) providing a tumbling bed of edible cores, said bed having a longitudinal axis extending from an entrance end to an exit end of the tumbling bed with the individual edible cores traveling through the bed from the entrance to the exit ends by rotating in a generally helical path along the longitudinal axis of the bed;
   b) forming a wet zone of the tumbling bed by continuously spraying the surface of the tumbling bed with a hydrating liquid, said wet zone being generally rectangular with the major dimension of the wet zone being substantially parallel to the longitudinal axis of the tumbling bed;
   c) forming a dry zone of the tumbling bed by continuously dusting the surface of the tumbling bed with a farinaceous powder, said dry zone also being generally rectangular with the major dimension of the dry zone also being substantially parallel to the longitudinal axis of the bed, with said wet and dry zones not overlapping;
   d) continuing the simultaneous spraying and dusting of the wet and dry zones respectively at liquid and powder application rates suitable to prevent aggregation of the edible cores tumbling repeatedly through said wet and dry zones in the bed and to thereby form non-aggregated dough-coated edible cores wherein the dough coating on said cores comprises flour, starch and sugar in a weight ratio of flour and starch to sugar of from about 0.5:1 to 30:1; and thereafter
   e) cooking the non-aggregated dough-coated edible cores emerging from the exit end of the tumbling bed, to thereby produce non-aggregated edible cores uniformly coated with a crisp farinaceous material.

2. The continuous process according to claim 1 wherein the hydrating liquid comprises up to about 100% by weight of water and from about 0 to 60% by weight of sugar, and wherein the farinaceous powder comprises from about 20 to 100% by weight of flour and from about 0 to 50% by weight of pregelatinized starch.

3. The continuous process according to claim 2 wherein the farinaceous powder comprises from about 35 to 95% by weight of flour and from about 5 to 40% by weight of pregelatinized modified waxy starch.

4. The continuous process according to claim 3 wherein the flour comprises rice flour.

5. The continuous process according to claim 1 wherein the crisp farinaceous coating represent from about 15 to 70% by weight of the coated edible core.

6. The continuous process according to claim 5 wherein the crisp farinaceous coating represents from about 30 to 50% by weight of the coated edible core.

7. The continuous process according to claim 1 wherein the coatable edible cores are selected from the group consisting of nuts, seeds, beans, fruits, meats, cereals, particulates thereof, and agglomerates thereof.

8. The continuous process according to claim 7 wherein the coatable edible cores are peanuts.

9. The continuous process according to claim 1 wherein the weight ratio of flour and starch to sugar in the dough coating is from about 1.5:1 to 10:1.

10. The continuous process according to claim 1 wherein the major dimension of the dry zone toward the exit end of the tumbling bed extends beyond the major dimension of the wet zone toward the exit end of the bed.

11. The continuous process according to claim 10 wherein the major dimensions of the dry zone(s) toward the entrance and exit ends of the tumbling bed extend beyond the the major dimensions of the wet zone(s) toward said entrance and exit ends of the tumbling bed.

12. The continuous process according to claim 10 wherein the the area of the major dimension of the dry zone that extends beyond the major dimension of the wet zone toward the exit end of the tumbling bed is continuously dusted with a farinaceous powder comprising a native ungelatinized starch.

13. The continuous process according to claim 1 wherein the wet zone comprises a series of non-overlapping wet zones positioned sequentially along the longitudinal axis of the tumbling bed.

14. The continuous process according to claim 1 wherein the cooking step (d) comprises baking the non-aggregated dough-coated edible cores as they emerge from the exit end of the tumbling bed, to thereby produce non-aggregated edible cores uniformly coated with a crisp farinaceous material.

15. Non-aggregated edible cores uniformly coated with a crisp farinaceous material, which product is made by the process according to claim 7.

16. Non-aggregated edible cores uniformly coated with a crisp farinaceous material, which product is made by the process according to claim 4.

17. Non-aggregated edible cores uniformly coated with a crisp farinaceous material, which product is made by the process according to claim 5.

18. Non-aggregated edible cores uniformly coated with a crisp farinaceous material, which product is made by the process according to claim 15.

19. Non-aggregated edible cores uniformly coated with a crisp farinaceous material, which product is made by the process according to claim 8.

20. Non-aggregated edible cores uniformly coated with a crisp farinaceous material, which product is made by the process according to claim 12.

21. Non-aggregated edible cores uniformly coated with a crisp farinaceous material, which product is made by the process according to claim 14.

* * * * *